Sept. 27, 1949.   L. T. MILLER   2,483,291
METHOD OF OIL TEMPERATURE CONTROL
Original Filed Oct. 7, 1941   4 Sheets-Sheet 1
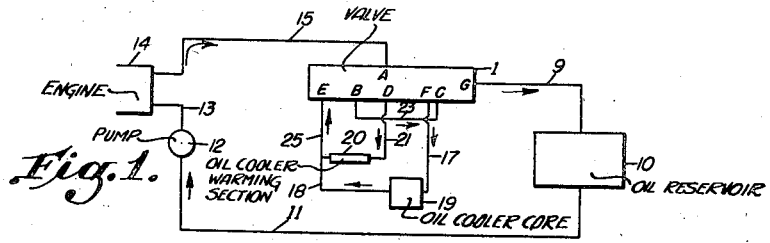
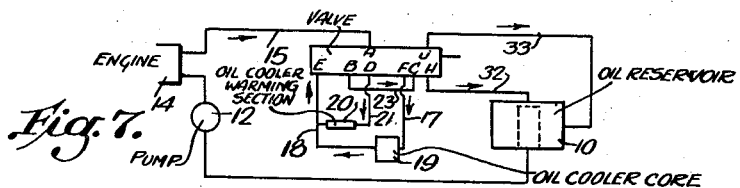
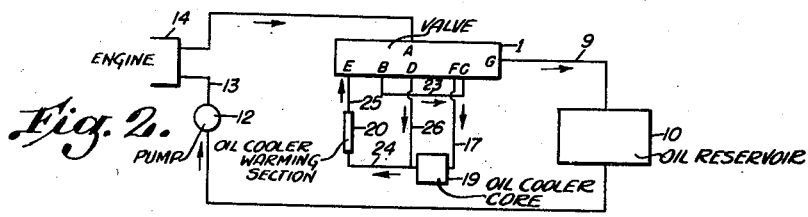
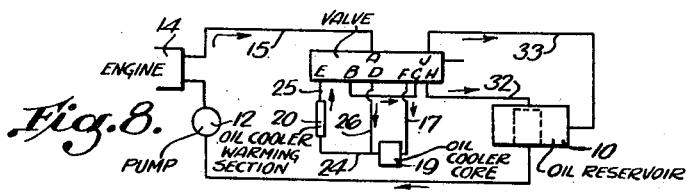
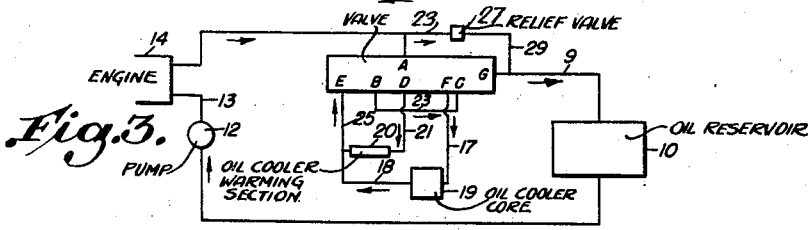
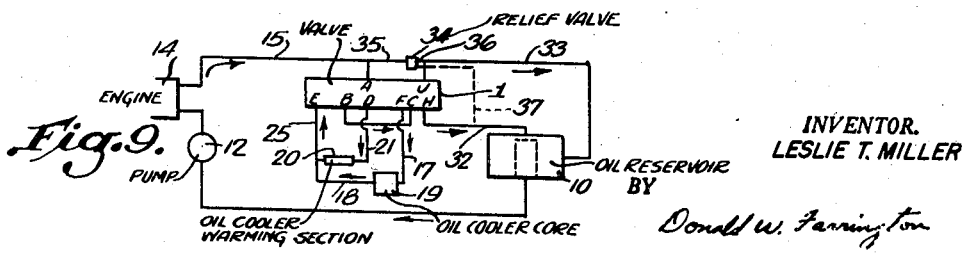
INVENTOR.
LESLIE T. MILLER
BY
Donald W. Farrington
ATTORNEY Sept. 27, 1949.　　　　　L. T. MILLER　　　　　2,483,291
METHOD OF OIL TEMPERATURE CONTROL
Original Filed Oct. 7, 1941　　　　　　　　　　4 Sheets-Sheet 2

INVENTOR.
LESLIE T. MILLER
BY
Donald W. Farrington
ATTORNEY

Sept. 27, 1949.  L. T. MILLER  2,483,291
METHOD OF OIL TEMPERATURE CONTROL
Original Filed Oct. 7, 1941  4 Sheets-Sheet 3

INVENTOR.
LESLIE T. MILLER
BY
Donald W. Farrington
ATTORNEY

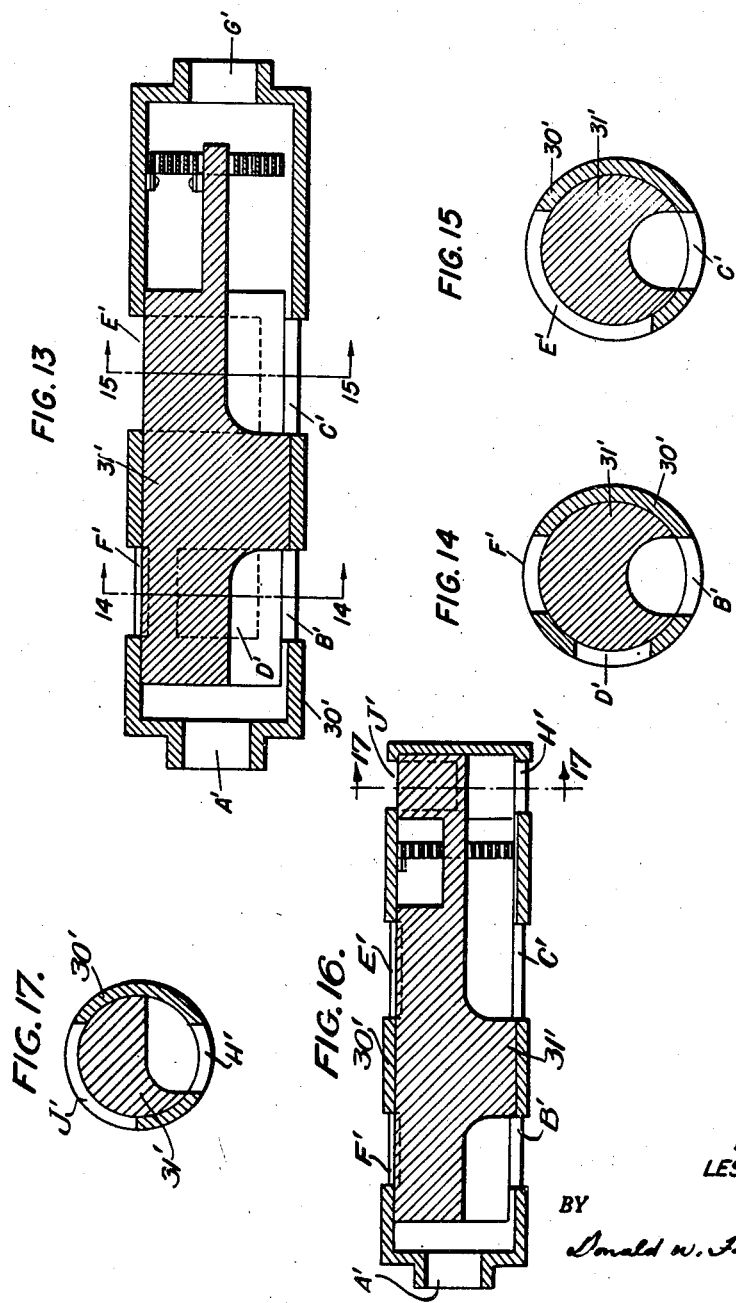

Patented Sept. 27, 1949

2,483,291

UNITED STATES PATENT OFFICE 2,483,291

METHOD OF OIL TEMPERATURE CONTROL

Leslie T. Miller, Stoneleigh, Md., assignor to The Glenn L. Martin Company, Middle River, Md., a corporation of Maryland Original application October 7, 1941, Serial No. 414,005. Divided and this application November 21, 1944, Serial No. 564,528

1 Claim. (Cl. 236—34)

Primarily, this invention relates to a method for maintaining the oil temperature in the lubricating system of an internal combustion engine system within a narrow range, and more particularly to such a system in which the excessive oil pressures prevailing during the initial starting and warm-up period of the engine are eliminated.

This application is a division of application Serial No. 414,005, filed October 7, 1941, now Patent No. 2,374,639, dated April 24, 1945.

In operating internal combustion engines, especially aircraft engines, it is essential that the temperature of the lubricating oil in the engine be maintained at a relatively constant temperature for optimum engine operation. Not only must the oil be quickly brought up to this desired temperature, but throughout the flight of the aircraft, it must be maintained and not permitted to become either too hot or too cool.

Another important feature of the present system and apparatus thereof is the substantially complete removal of excessive oil pressures which are prevalent when the oil is cold and the engine is first started up. In modern aircraft, warm-up chambers and oil coolers have been proposed, but due to the inherent construction of conventional oil coolers by which attempts have been made to maintain constant oil conditions, these coolers must not be subjected to pressures in excess of their structural limits. The conventional oil coolers such as are used in modern aircraft comprise primary and secondary heat exchange sections or cores, the structure of which is necessarily of thin material to promote more efficient heat exchange. Maximum cooling of the oil is obtained by directing the oil through both sections of the heat exchanger. A partial cooling of the oil is obtained by causing the oil to flow through a small or secondary portion of the heat exchanger. This small portion of the heat exchanger, used for limited cooling of the oil, is termed, in the industry, an oil cooler warming section or a warm-up section of the oil cooler. By this is meant that only this small portion of the heat exchanger is used for limited cooling of the oil during the process of warming up the engine from a cold start. In this application, we shall refer to the main section of the heat exchanger as the primary heat exchanger and the section used during the warming period as a secondary heat exchanger. It is to be understood from the above description that the primary and secondary heat exchangers may be portions of a single commercial heat exchange unit. These structural limits can be increased but at great sacrifice as to weight. Heretofore, the pressures created by the cold oil have oftentimes burst these conventional types of coolers and resulted in great danger to the aircraft and crew.

Among the objects and advantages of the present method is the complete elimination of these hazards and the precise regulation and control of the oil temperature under all conditions, including initial starting, preliminary warm-up and actual flight.

It has been previously proposed to control oil temperature by a valve located at the inlet to the engine, this valve regulating the flow to the oil cooler or to a by-pass line to the oil tank. With such a valve, there is a considerable quantity of oil in the circuit between the oil cooler and the valve, including, as it does, the amount of oil in the tank; thus, it should be noted that this quantity of oil must pass through the valve before it can operate to change the amount of cooling to reduce the oil temperature. This lag results in uneven temperature and may result in a hazardous condition when the heat input from the engine to the oil is suddenly increased tremendously due to a change of operating conditions. By placing a thermostatic element immediately adjacent to the oil cooler, and preferably bolted thereto, this time lag is decreased, and the necessity for an additional line back to the oil tank is eliminated.

This invention contemplates the relieving of dangerous pressures after the engine has been first started, the warming up of the oil returning from the engine to bring it up to operating temperature, and the cooling of the oil should it attempt to exceed the desired temperature. In addition, the system and apparatus permit the automatic warming of the oil if during flight the cooler lowers its temperature to a degree below that desired for operation.

In the drawings:

Figure 1 is a diagrammatical layout of the system showing a means of controlling the flow of oil during the different periods of operation.

Figure 2 is a basically similar system to Figure 1 with means for circulating the oil through the secondary heat exchanger and through both the secondary heat exchanger and primary heat exchanger at a higher temperature.

Figure 3 is also a similar system to that of Figure 1 but having a pressure relief valve therein for further protection against excessive pressures.

Fig. 7 is a modification of the lubricating system disclosed in Fig. 1 and includes additional ports for circulating the oil from the multiple control valve to the reservoir through a plurality of conduits.

Fig. 8 is a modification of the circuit shown in Fig. 7 with the additional outlet ports.

Fig. 9 is a further modification of the circuit illustrated in Fig. 7 embodying the dual oil return system in combination with a pressure relief valve and safety oil circuit.

Figs. 13, 14 and 15 show a further modified form of temperature controlled valve similar in operation to the valve shown in Figs. 4, 5 and 6 but adapted to be rotated by the oil temperature.

Figure 13 is a vertical cross section through this modified valve, while Figures 14 and 15 are vertical, transverse sections taken on lines 14—14 and 15—15, respectively, of Figure 13.

Figure 10:
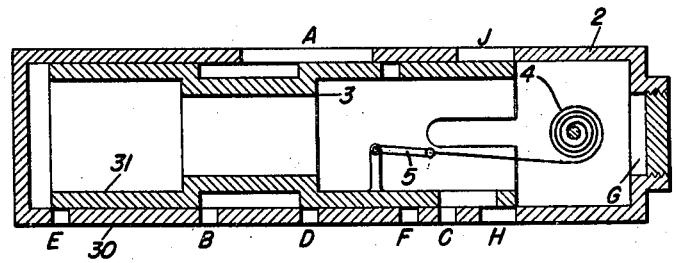
Figs. 10, 11 and 12 are vertical cross sections of the modified sliding type of control valve used in combination with the dual return lubricating system shown in Figs. 7, 8 and 9.
Figure 11:
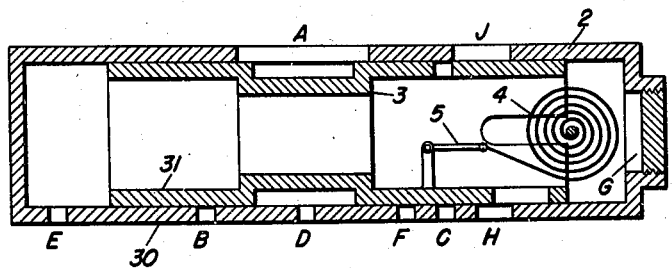
Figure 12:
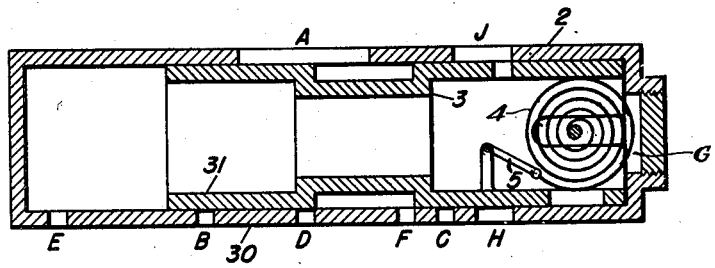

Figures 16 and 17 show a further modified form of rotary valve corresponding to the valve illustrated in Figures 10 to 12, inclusive, but using a rotary valve plug instead of a sliding sleeve.

Figure 16 is a vertical, longitudinal cross section of the modified form of rotary valve.

Figure 17 is a vertical, transverse section taken on line 17—17 of Figure 16.

Referring now to Figures 1, 4, 5 and 6 of the drawings, numeral 1 denotes a multi-port thermostatically controlled valve comprising an outer casing 2 and an inner multi-ported reciprocating sleeve, or cylinder, 3 adapted to receive the movement from a thermostatic coil 4 attached to the inner sleeve 3 through linkage mechanism 5. As shown, the oil outlet port G discharges into a conduit 9 leading to an oil tank, or reservoir, 10 from thence it passes through conduit 11 to pump 12 and conduit 13 into an engine 14, from the engine back to the inlet port A of the control valve 1 through conduit 15.

A primary heat exchanger 19 of suitable capacity and thermal characteristics is joined to the control valve 1 and port F thereof by conduit 17, while the opposite side of the primary heat exchanger is provided with conduit 18 in communication with a secondary heat exchanger 20 having a conduit 21 leading to port D. The conduit 18 is also joined to the control valve and port E thereof through conduit 25. A by-pass line 23 joins ports C and B.

The sequence of operation of these several ports is controlled through the inner sliding valve sleeve 3 acting under the influence of the thermostatic device 4, and the particular flow through these ports will now be described in detail.

When starting up, the engine 14 is cold as is the oil supply in the system, including the tank 10. It will be obvious that if this low viscosity cold oil is permitted to circulate through the primary heat exchanger 19, or through secondary heat exchanger 20, the resistance built up in the system will be of such magnitude that there is great danger of rupturing the core of the heat exchanger. Consequently, due to the action of the thermostatic device 4, the control valve 1 permits the cold oil to enter port A and freely pass out through port B through conduit 23 back into the valve through port C and be discharged therefrom through port G into the reservoir 10. Thus, during the initial start-up period when the oil is cold, it is permitted to pass through the system without undue restriction and without building up substantial pressures to thus completely eliminate its passage through either primary core 19 or secondary heat exchanger 20.

As the oil temperature starts to rise due to heat absorbed thereby from the engine 14, the temperature responsive element 4 moves the valve sleeve 3 to close off ports B and C and open ports D and E. When this occurs, the oil enters port A and flows out through port D into conduit 21 and passes through the secondary heat exchanger 20, which in practice is combined with the oil heat exchanger core 19 and forms in effect an oil heat exchanger assembly, and thence through conduit 25 to port E to be discharged through outlet port G.

As the oil temperature further increases and reaches the desired operating temperature, the thermostatic device moves in such a manner as to close port D and open port F. When the valve is in this position, oil enters the port A, flows through port F, returns through the primary heat exchanger core 19, through conduits 18 and 25 to port E from whence it passes through the open tubular portion of the valve and outlet G.

The system illustrated in Figure 2 is quite similar to that described in explaining the operation of Figure 1. The major difference and furtherance of the present novel lubricating system shown in this figure is the means by which the primary heat exchanger and secondary heat exchanger may be connected to the control valve in such a manner that the oil may selectively flow through the secondary section at one temperature and through both the secondary section and primary section at a higher temperature.

With the arrangement of Figure 2, the primary heat exchanger 19 is joined to the control valve 1 and port F thereof by conduit 17, while the other side of the primary heat exchanger is connected by conduit 24 leading to the secondary unit 20 and thence through conduit 25 to port E. The conduit 24 also communicates with the control valve port D by jointure with conduit 26.

In operation, as the oil temperature in the system starts to rise due to heat absorption from the initial operating period of the engine 14, the temperature responsive element 4 moves the inner valve cylinder 3 to close off ports B and C while opening ports D and E. When this occurs, the preliminarily heated oil enters port A through conduit 15 and flows around the valve cylinder and out through port D into conduits 26 and 24, through the secondary section 20 and thence through conduit 25 to port E whence it is discharged in the central bore of the valve and flows out of the valve through port G to the line 9 running to tank 10.

After the oil temperature rises and assumes the desired predetermined operating temperature, the thermal operator 4 moves the sleeve 3 to close port D and open port F. In this position, oil enters port A, flows around the sleeve and out through port F, then to the primary core 19 through conduit 24 to the secondary heat exchanger 20, through conduit 25 to port E and thence into the central tubular bore of the valve and through discharge outlet G.

Figure 3 carries the improved lubricating system of Figure 1 further by adding the pressure relief valve 27 into the inlet line 15 and outlet line 9, whereby oil is relieved through conduit 28, relief valve 27 and conduit 29. Thus, if excessive presures for any reason build up between inlet oil at port A and outlet port G, it may reach the relief valve and be by-passed around the control valve directly to reservoir 10. While the relief valve 27 has been shown external to the valve, it is obvious that it may be incorporated in the sleeve if so desired so long as it is capable of communication with port A and port G.

The modified systems shown in Figures 7, 8 and 9, together with the modified multi-port sliding control valve illustrated in Figures 10, 11 and 12, are fundamentally the same as the systems and control valve previously described in Figures 1, 2 and 3, and 4, 5 and 6, respectively.

The purpose of these modified systems is to readily control the oil under the conditions of starting and flight as above described with the added feature of control when it is desired that the oil lead to different sections of the oil tank. Under certain conditions, this further control is an advantage, and to accomplish the same, the control valve 1 is provided with additional ports H and J. The inner sliding cylinder 3 is also modified at portions 30 and 31, see particularly Figures 7, 10, 11 and 12.

Figure 4:
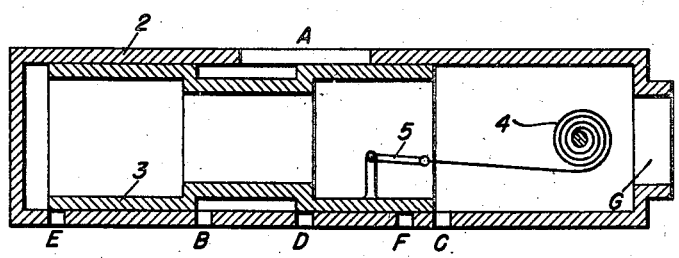
Fig. 4 is a vertical cross section through a temperature regulating valve of the reciprocating type used to control these several conditions in a system as shown in Fig. 1.
Figure 5:
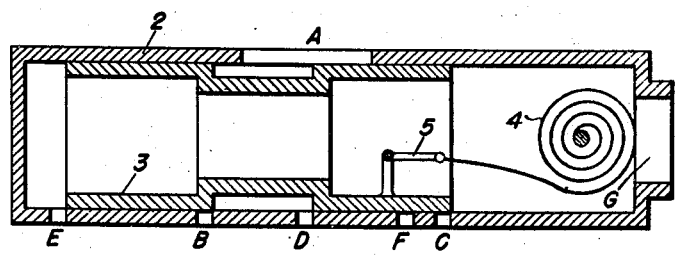
Figs. 5 and 6 are similar to Fig. 4 but showing the sliding regulating valve in varying positions.
Figure 6:
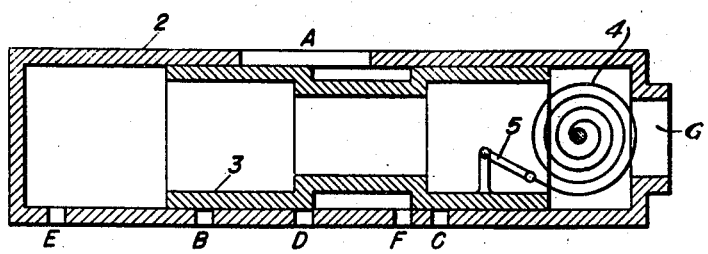

The reciprocating control valve in these figures performs the functions and operations of the valve shown in Figures 4, 5 and 6, although instead of allowing the oil to flow through outlet G and return to tank 10 through the single conduit 9, the oil at lower temperatures may flow out of port H, through conduit 32 to one section of the reservoir tank. At a second predetermined temperature, see Figure 12, the port H will be closed and port J opened; whereupon, the oil will flow out through port J, through conduit 33 to a different section of the tank 10. It is to be understood that at intermediate temperatures, or during a change of temperature, both ports H and J will be open and oil may return to the reservoir through both conduit 32 and 33.

In Figure 9, the modified system of Figure 7 is provided with a pressure relief valve 34 communicating with the inlet port A through conduit 35 and through conduit 36 with line 33 leading to the oil tank 10. However, the relief valve may be joined to the other tank line 32 by conduit 37, shown in dotted lines.

Figures 13, 14 and 15 show an arrangement of the valve shown in Figure 4 whereby the sleeve, or plug, 31 is rotated instead of translated to register the ports. Ports on this valve have been lettered A', B', C', D', E', F' and G' and perform similar functions to those lettered A, B, C, D, E, F and G, respectively, of the valve shown in Figure 4. Thus, it is apparent that the valve shown in Figure 13 may be used in those circuits where the valve shown in Figure 4 has been used since it performs the same function.

Figures 16 and 17 show a rotary valve performing the same functions as that valve shown in Figure 10, the sleeve 2 being rotated instead of translated to register with the ports. The ports are lettered A' to J', corresponding to those lettered A to J in Figure 10, and perform similar functions. It is obvious that this valve arrangement may be used in place of that shown in Figure 10 in the various diagrams shown.

While the thermal elements 4 have been shown for purposes of illustration as a spiral, the thermal element can be of other well known types such as a bellows, Sylphons or other elements translating temperature changes to motion.

To those skilled in the art, it will be evident that while the same thermostatic means may control these functions, the predetermined temperatures and routing of the outlet oil may be varied at will regardless of the sequence of operations of the main valve function.

I claim as my invention:

The method of controlling oil temperature in a system having an engine, an oil reservoir, primary and secondary heat exchangers, a common conduit leading from the heat exchangers to the reservoir and a thermal-responsive control means in said conduit, that comprises directing the flow of oil from the engine to the reservoir sequentially through each of three distinct paths all of which terminate in said common conduit, by first directing the oil through a by-pass closed with respect to said heat exchangers in response to a low oil temperature in said conduit constituting the first path, and thereafter directing the oil through said secondary heat exchanger in response to a predetermined higher oil temperature in said conduit constituting the second path, and thereafter directing the oil through said primary heat exchanger in response to an oil temperature in said conduit exceeding said last-named temperature constituting the third path.

LESLIE T. MILLER.

REFERENCES CITED

The following references are of record in the file of this patent:

UNITED STATES PATENTS

| Number | Name | Date |
|---|---|---|
| 1,311,809 | Giesler | July 29, 1919 |
| 1,414,780 | Giesler | May 2, 1922 |
| 1,860,731 | Cole | May 31, 1932 |
| 1,902,970 | Ramsaur | Mar. 28, 1933 |
| 1,913,680 | McCray | June 13, 1933 |
| 1,931,935 | Paugh | Oct. 24, 1933 |
| 2,107,188 | Ryder | Feb. 1, 1938 |
| 2,288,599 | Ramsaur | July 7, 1942 |

FOREIGN PATENTS

| Number | Country | Date |
|---|---|---|
| 253,233 | Great Britain | June 17, 1926 |
| 330,053 | Great Britain | June 5, 1930 |
| 461,707 | Great Britain | Feb. 23, 1937 |
| 495,233 | Great Britain | Nov. 9, 1938 |
| 846,300 | France | June 5, 1939 |